Sept. 28, 1926.  
J. R. BARTHOLOMEW  
VEHICLE BRAKE MECHANISM  
Filed Nov. 28, 1922
1,601,158
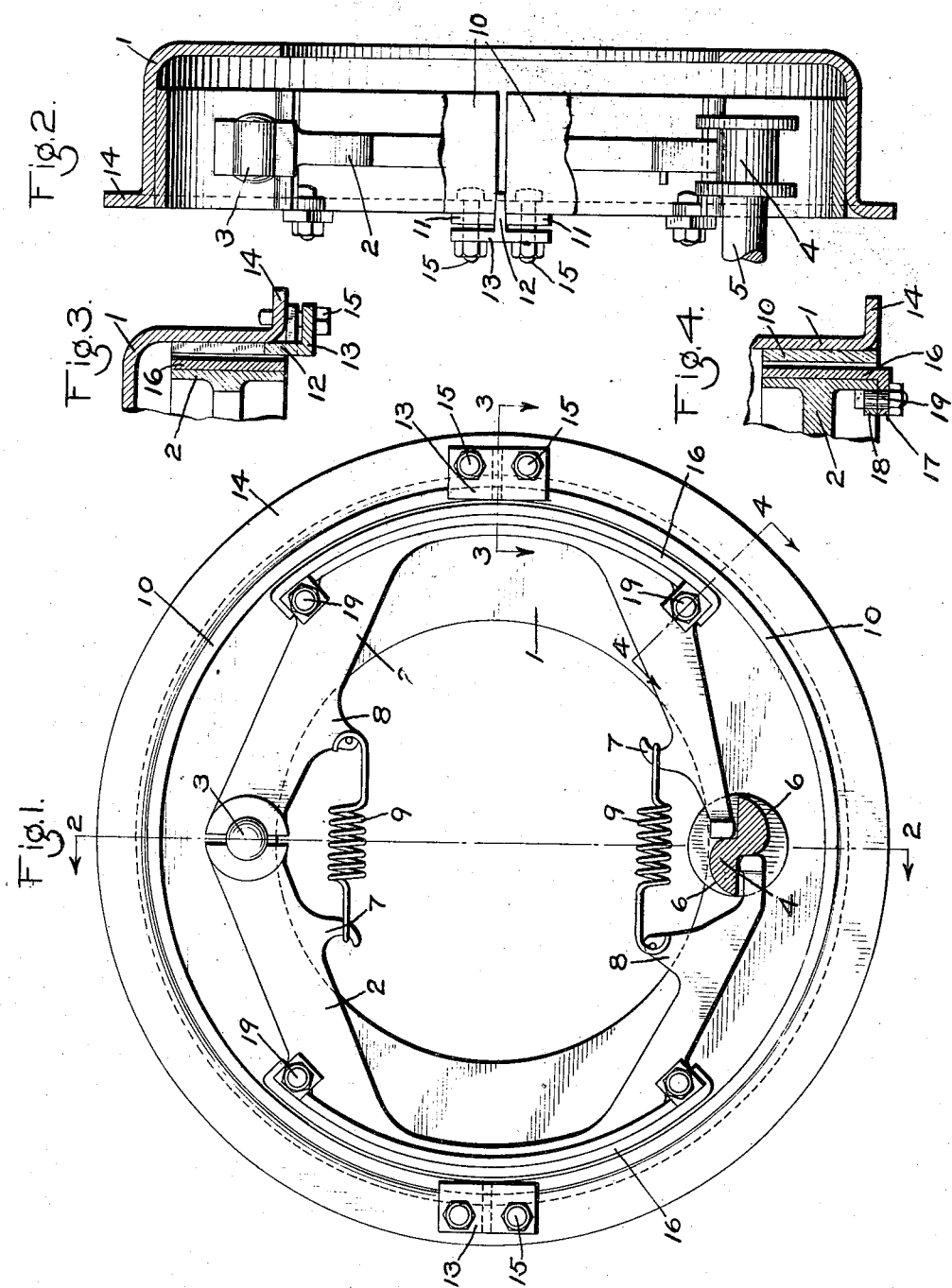
INVENTOR
JOHN R. BARTHOLOMEW
BY *Wm. M. Cady*
ATTORNEY Patented Sept. 28, 1926.

1,601,158

UNITED STATES PATENT OFFICE.

JOHN R. BARTHOLOMEW, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE MECHANISM.

Application filed November 28, 1922. Serial No. 603,775.

This invention relates to brake mechanisms of the drum type, more particularly as employed in automotive vehicles.

One object of my invention is to provide an improved cam construction for expanding the braking members into engagement with the internal braking surface of the brake drum.

Another object is to provide renewable members interposed between the brake drum and the brake shoes which may be easily renewed when the members become worn.

Other objects and advantages will appear in the following more detailed description of the invention.

In the accompanying drawing: Fig. 1 is a face view of a vehicle brake drum construction embodying my invention; Fig. 2 a section on the line 2—2 of Fig. 1; Fig. 3 a section on the line 3—3 of Fig. 1; and Fig. 4 a section on the line 4—4 of Fig. 1.

As shown in the drawing, the construction may comprise a brake drum 1 adapted to be secured to the vehicle wheel in the usual manner. Within the brake drum a pair of brake heads 2 are mounted and adjacent ends of the heads works on a hinge pin 3. The opposite ends of the heads are arranged in a staggered relation and interposed between said ends is a cam 4. According to my invention, this cam is so designed that the same will be effective throughout a turning movement of the cam shaft 5 of substantially 180°. The normal angular movement of the cam shaft 5 to apply and release the brakes may be only 15°, but as the braking members wear, the cam must be turned through a greater angle in order to effect frictional engagement between the brake shoes and the brake drum.

The cam 4 consists of oppositely extending wings each having a cam surface 6 adapted to engage the corresponding end of one of the brake heads 2. The cam surface 6 is on a curve such that for a given angular rotative movement of the cam, the expansive or spreading movement of the brake heads will be constant and uniform, so that as the braking members wear and the cam assumes a more advanced position in applying the brakes, the brake lever ratio will remain the same. Each brake head 2 is provided with lugs 7 and 8, the lug 7 of one brake head being connected to the lug 8 of the other brake shoes by a coil spring 9 which serves to move the brake heads to release position, when the brakes are released.

In order to provide the braking members with renewable braking surfaces, renewable liners are employed both on the brake heads and on the brake drum. The brake drum liners comprise two semi-cylindrical metal bands 10 having lugs 11 at the ends. When the bands 10 are positioned within the drum 1, a space is provided between the adjacent ends of the bands, within which a wedge portion 12 of a plate 13 is inserted. Bolts 15 are passed through alining openings in the flange portion 14 of the drum, the lugs 11 and the plate 13 and when the bolts are drawn up, the wedge portion 12 forces the liners 10 apart and thus securely wedges the liners within the brake drum 1. Since the bolts 15 are readily accessible from the side of the drum, the liners 10 may be very easily renewed when worn and replaced by new liners, without having to disturb or disconnect any other part.

For the brake heads 2, renewable brake shoes or liners 16 are provided, each having lugs 17 at the opposite ends adapted to register with lugs 18 on the brake heads 2. The lugs 17 and 18 are provided with openings for clamping bolts 19, by which the shoes are secured to the brake heads. The construction of the brake shoes is such that as in the case of the brake drum liners, worn shoes may be readily removed and new shoes applied without disturbing other parts of the brake mechanism.

Having now described my invention, what I claim as new and desire to secure by Letters Patent, is:—

The combination with a brake drum having an internal braking surface, of expansible brake members having braking surfaces adapted to engage the braking surface of the drum and a cam for spreading said members having opposite wings, each provided with a cam face adapted to operatively engage a co-operating brake member throughout a rotative movement of substantially 180°, the cam face being so disposed that the spread produced maintains a constant ratio to the angular rotative movement of the cam.

In testimony whereof I have hereunto set my hand.

JOHN R. BARTHOLOMEW.